United States Patent [19]

Keeton et al.

[11] Patent Number: 4,543,743
[45] Date of Patent: Oct. 1, 1985

[54] HERBICIDE APPLICATOR

[75] Inventors: John H. Keeton, Campbellsville; Lyle S. Keeton; Eugene G. Keeton, both of Trenton, all of Ky.

[73] Assignee: Keeton Enterprises, Campbellsville, Ky.

[21] Appl. No.: 164,917

[22] Filed: Jun. 30, 1980

Related U.S. Application Data

[63] Continuation-in-part of Ser. No. 117,514, Feb. 1, 1980, Pat. No. 4,276,719, which is a continuation-in-part of Ser. No. 101,567, Dec. 10, 1979, Pat. No. 4,276,718.

[51] Int. Cl.$^4$ ................................................. B05C 1/00
[52] U.S. Cl. ....................................... 47/1.5; 215/306; 401/130
[58] Field of Search ............................... 401/118–130; 215/306; 220/375; 47/1.5

[56] References Cited

U.S. PATENT DOCUMENTS

| | | | |
|---|---|---|---|
| 69,415 | 10/1867 | Dean | 401/121 |
| 643,855 | 2/1900 | Williamson | 401/118 X |
| 4,054,221 | 10/1977 | Glover | 215/306 X |
| 4,276,718 | 7/1981 | Keeton et al. | 47/1.5 |
| 4,276,719 | 7/1981 | Keeton et al. | 47/1.5 |

FOREIGN PATENT DOCUMENTS 1436613  3/1966  France ................................ 401/122

Primary Examiner—Robert E. Bagwill
Attorney, Agent, or Firm—Cushman, Darby & Cushman

[57] ABSTRACT

A portable herbicide applicator and method of destroying plants utilizing the same are provided that allow herbicide application in a safe, simple, and effective manner. The applicator includes a container having a closed end and an open end with a wiper positioned within the container. A fibrous exterior portion of an applicator structure is connected to a handle and is insertable into and withdrawable from the container, the wiping structure wiping excess liquid off of the fibrous covering when moved relative thereto. A cap is mounted by a strap to the container for closing the container open end while the herbicide applicator is being used, and a hook may be provided on the cap for hooking an opening on the handle and latching the applicator structure in place when it is positioned within the container. A strap on the container facilitates carrying with the open end facing upwardly. The fibrous portion is withdrawn from the container, pushed back in part-way to effect frothing of the herbicide, and then removed and touched to plants desirably destroyed.

30 Claims, 5 Drawing Figures

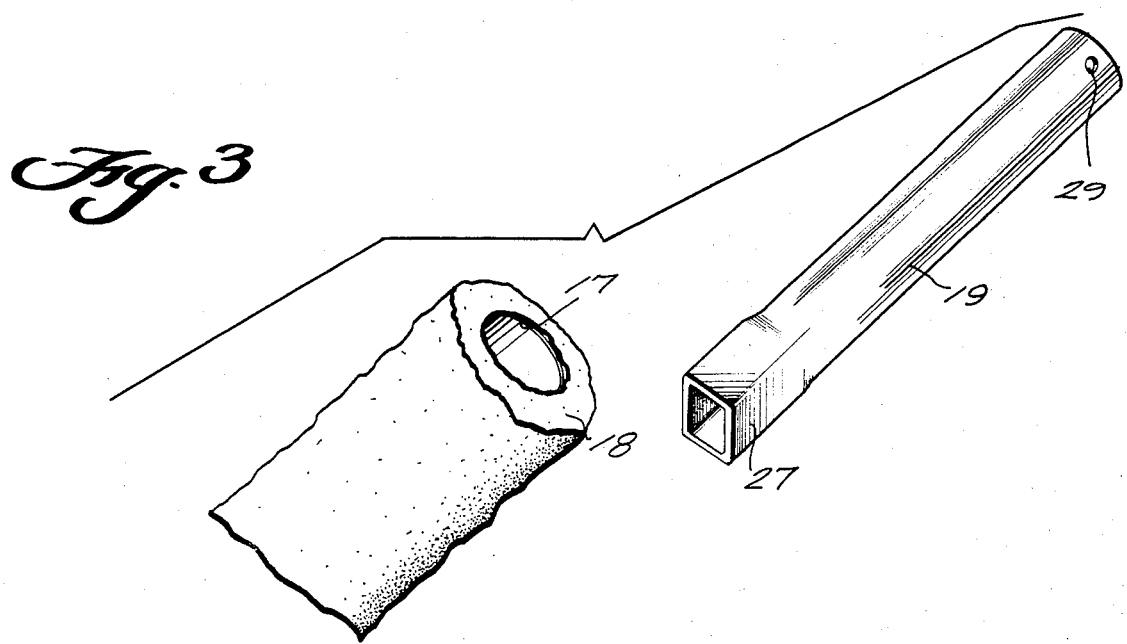
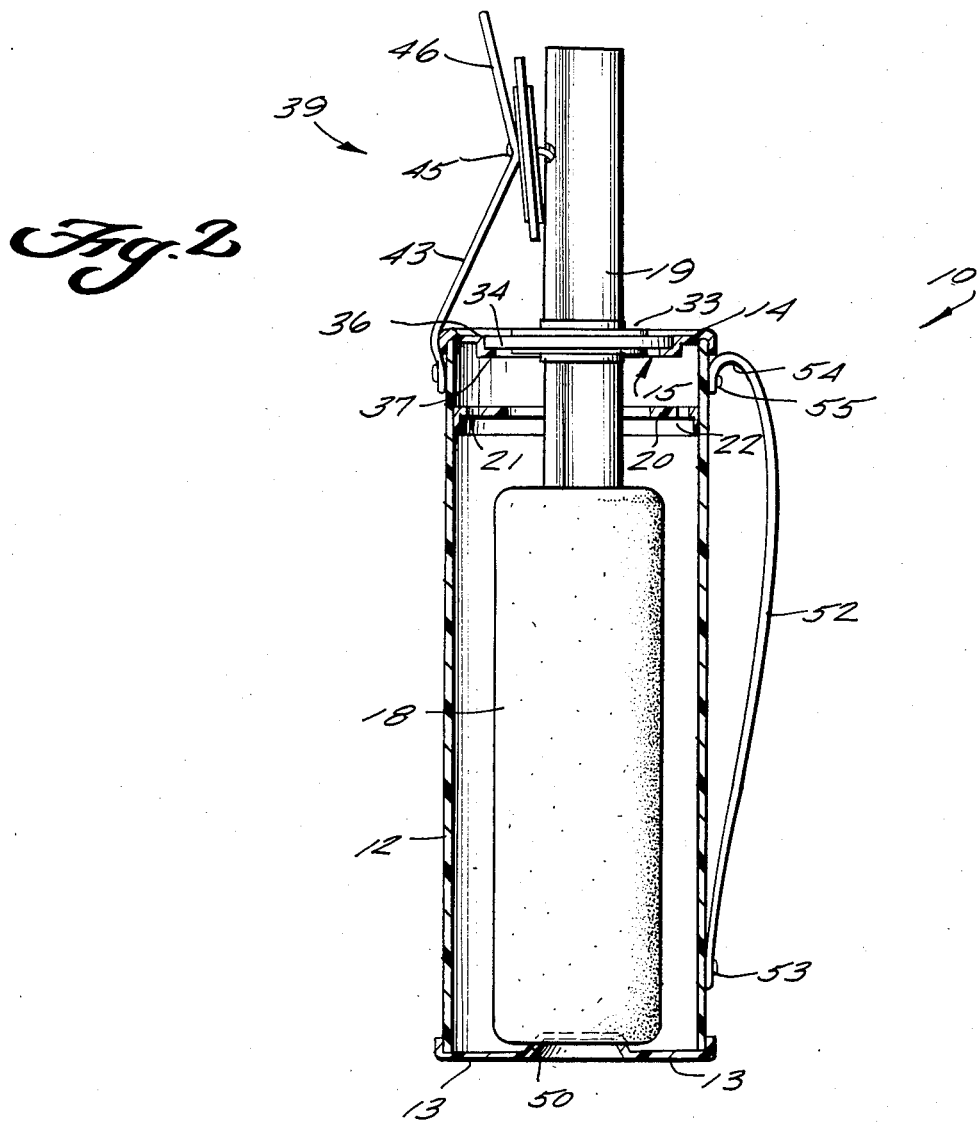

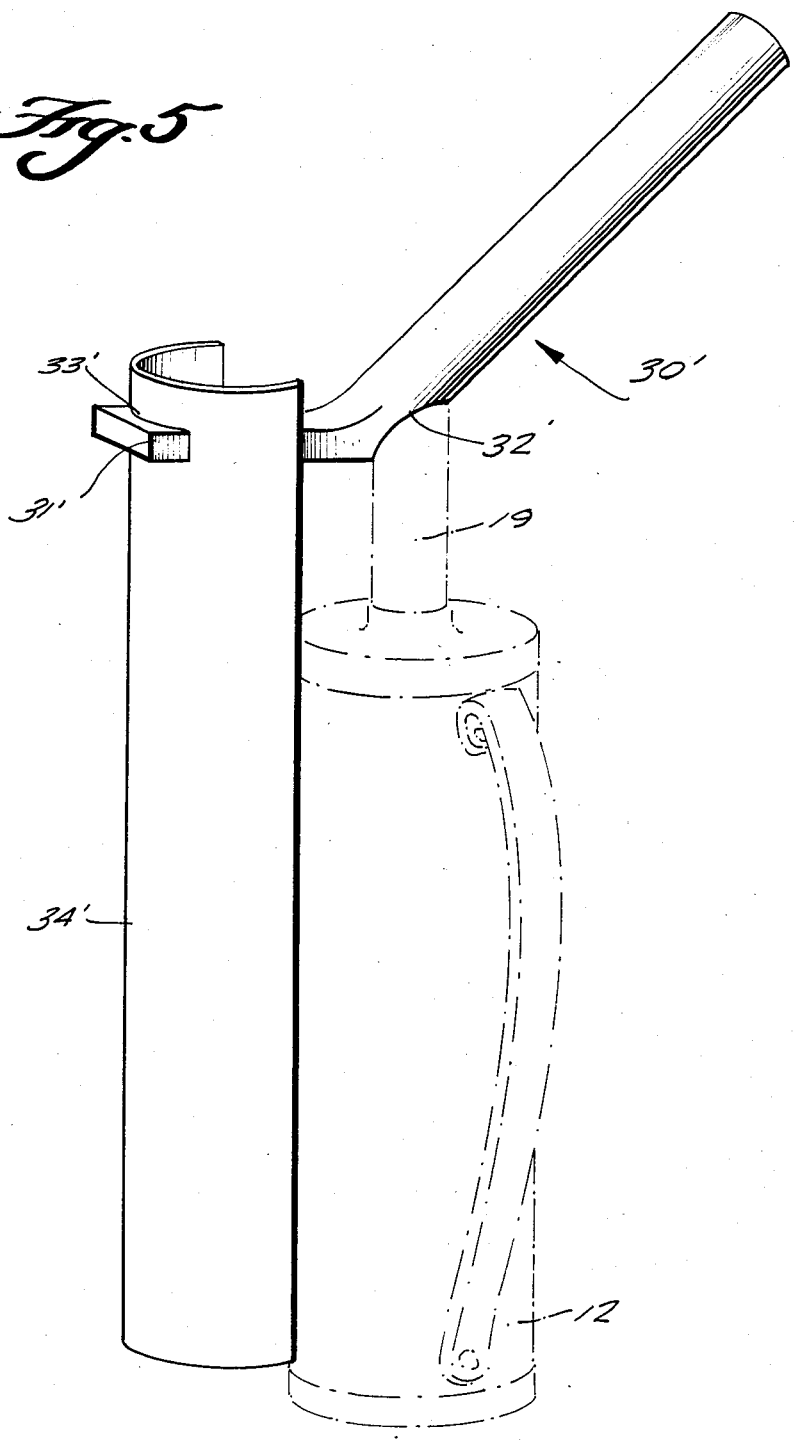

HERBICIDE APPLICATOR

CROSS REFERENCE TO RELATED APPLICATIONS

This application is a continuation-in-part of application Ser. No. 117,514, filed Feb. 1, 1980, now U.S. Pat. No. 4,276,719, which in turn is a continuation-in-part of application Ser. No. 101,567 filed Dec. 10, 1979, now U.S. Pat. No. 4,276,718 (the disclosures of each of which are hereby incorporated by reference herein).

BACKGROUND AND SUMMARY OF THE INVENTION

U.S. Pat. Nos. 4,276,718 and 4,276,719 disclose methods and apparatus for effectively and efficiently applying contact herbicides to undesired plant growth to effect destruction thereof. While the structures and methods disclosed therein are emminently suited for their intended purpose, it is desirable under some circumstances to more positively insure that the herbicide when applied is in its maximum effective form. Conventional contact herbicides that are applied, such as ROUNDUP by Monsanto, are neutralized when brought into contact with certain foreign substances, such as clay. Additionally, some of such contact herbicides are more effective when caused to foam or froth just prior to application to weeds to be killed. Further in some horticultural applications positive prevention of contact with desired plants must be provided. According to the present invention, all these factors are taken into account in providing a simple and reliable method and apparatus for applying contact herbicides to plants in as effective a manner as practical.

According to one aspect of the method according to the present invention, a portable liquid applicator device is utilized. The device includes a container having a first, closed end and a second end with an opening therein; a wiping structure mounted in the container adjacent, but spaced from the open second end; and a liquid applicator structure with a fibrous exterior portion for holding liquid herbicide, insertable into and withdrawal from the container through the opening in the second end, and having a handle. The following method steps are practiced: (a) Liquid contact herbicide is disposed within the container so that it is partially filled with liquid, below the level of the wiping structure and, (b) the liquid applicator structure is inserted through the opening in the container second end to generally immerse a portion of the liquid applicator structure fibrous exterior portion in liquid herbicide, with the handle sticking outwardly from the container so that the handle never touches the herbicide. (c) The liquid applicator structure is partially removed, with herbicide held thereby, from the container by pulling on the handle to partially withdraw it as the fibrous exterior portion thereof is being wiped by the wiping structure, to a point just short of the end of travel of the liquid applicator structure with respect to the wiping structure. (d) The liquid applicator structure is then reinserted into the container to provide a reverse wiping of the fibrous exterior but so that the fibrous exterior of the liquid applicator structure does not become substantially immersed in liquid herbicide within the container, and (e) the liquid applicator structure is re-withdrawn from the container through the open second end thereof by pulling on the handle and completely removing the liquid applicator structure from the container, with frothed (foamed) herbicide held by the fibrous exterior portion. Then (f) the applicator structure fibrous exterior portion is touched to plants that are to be desirably destroyed so that herbicide is transferred from the structure to the plants, and (g) steps (b) through (f), if necessary, are occasionally repeated until desired plant destruction is completed, or until more liquid herbicide must be disposed in the container. The action between the fibrous exterior portion of the liquid applicator structure and the wiping structure during the back-and-forth relative movement therebetween effects frothing of the herbicide, rendering it more effective when plants are touched by the herbicide.

The liquid applicator device is constructed, according to the present invention, so that the wiping structure is properly positioned between the container second end and the volume of liquid herbicide within the container, so that the desired frothing action can occur without substantial re-immersion of the fibrous exterior portion of the liquid applicator structure in the liquid herbicide bath within the container. The wiping structure preferably comprises a ring having an opening diameter slightly smaller than the outside diameter of the fibrous exterior portion of the liquid applicator structure, which structure preferably comprises a conventional paint roller. One or more drainage holes are provided in the wiping ring to allow the herbicide that is wiped off thereby to drain back into the container.

According to another aspect of the method of the present invention, it is desirable to insure that no formed particles, such as clay particles, enter the container as it is being carried about by the user with the liquid applicator structure withdrawn. Of course it is also desirable to latch the liquid applicator structure in place within the container in sealing relationship with the container second end opening when the herbicide applicator is not being utilized, but is merely being transported or stored. To this end, a capping structure is provided operatively attached to the container so that it may be moved from a position spaced from the container second end opening and allowing access by the liquid applicator structure thereto, to a position in closing and sealing engagement with the opening. The cap is then secured in place when the liquid applicator device is withdrawn, and is removed prior to reinsertion of the liquid applicator device. Also, a latching arrangement may be associated with the cap and/or its attaching means to the container, to engage an opening in the liquid applicator structure handle to latch the liquid applicator structure in place in closing and sealing engagement with the second end opening. The structure facilitating this aspect of the method according to the present invention preferably comprises a strap connected at one end thereof to the container, and connected adjacent the other end thereof to a cap. A portion of the other end of the strap past the cap is free to facilitate grasping thereof to effect movement of the cap from its closing and sealing position. A hook is preferably provided on the cap for receipt by a hook-receiving opening in the handle, which latches the handle in place when the hook and opening are in operative engagement.

According to other aspects of the present invention, the liquid applicator device preferably is formed as a roller having a relatively rigid core with a fibrous covering thereon (i.e. a conventional paint roller). The handle includes one end thereof shaped so as to tightly frictionally engage the interior of the paint roller core. The handle is forced into place originally, and when the roller wears out, is contaminated, or the like, the roller may be removed from the handle and the handle reinserted into frictional engagement with a new roller core interior. Additionally a carrying strap is provided which facilitates carrying of the container with the second end thereof pointing upwardly, and the interior of the first end of the container is formed with a locating portion for positively aligning the roller in the container. The cap and the closing and sealing structure associated with the roller handle, are formed in simple yet effective manner. Positive prevention of roller contact with desired plants in horticultrual applications is provided by a bent handle extension keyed to a semi-circular guard.

It is the primary object of the present invention to provide a method and device for simple yet effective application of contact herbicide to undesired plant growth. This and other objects of the invention will become clear from an inspection of the detailed description of the invention, and from the appended claims.

BRIEF DESCRIPTION OF THE DRAWINGS

FIG. 2 is a side view, partly in cross-section and partly in elevation, of the device of FIG. 1 but showing the latching structure in place;

FIG. 3 is an exploded perspective detail view of the handle and roller of the liquid applicator structure of FIG. 1; FIG. 5 is a perspective view of a handle extension and guard structure particularly for adapting the device of FIG. 1 for horticultural uses.

DETAILED DESCRIPTION OF THE DRAWINGS

Figure 1:
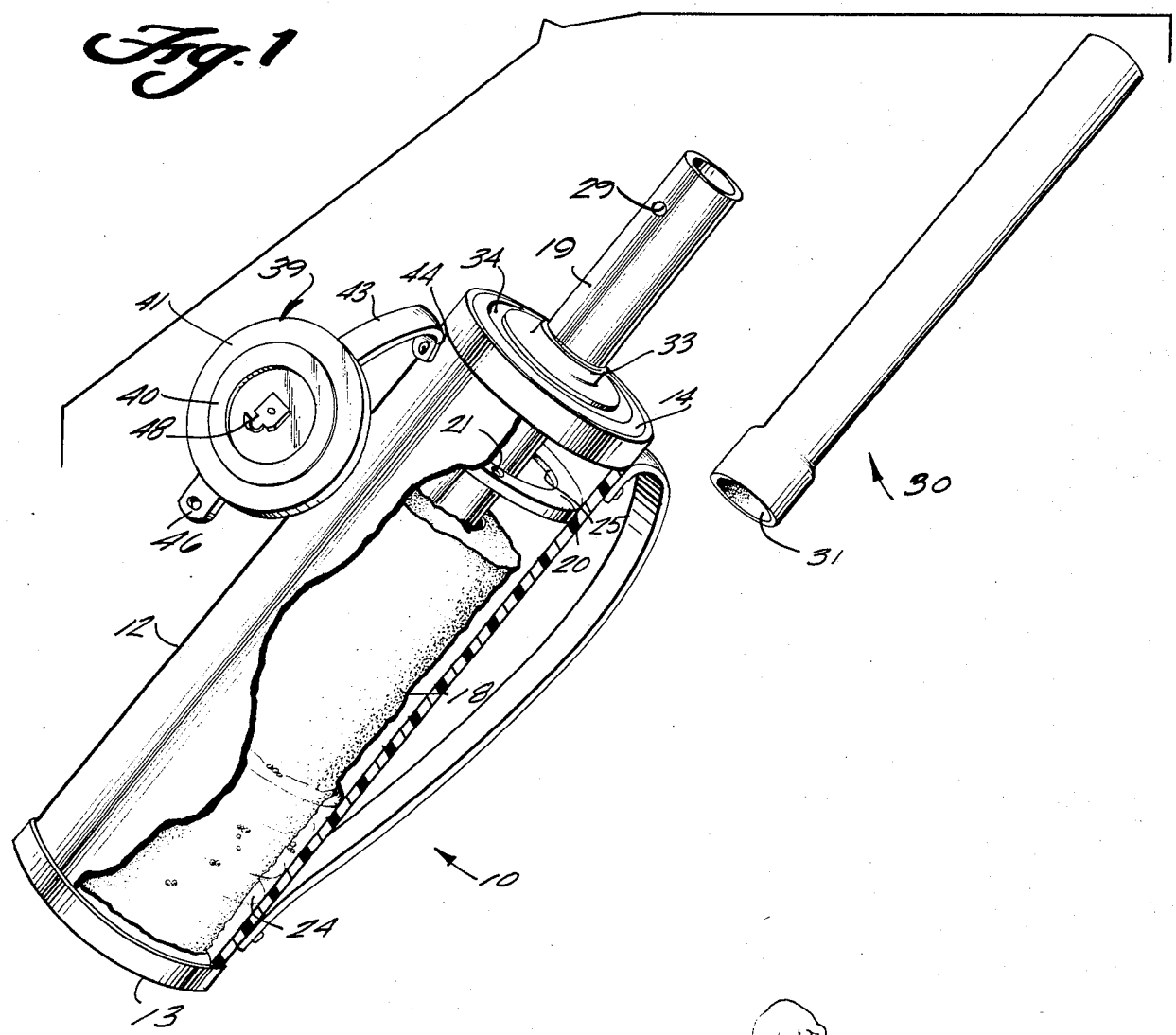
FIG. 1 is a perspective view, with portions of the container cut away to illustrate the interior thereof, of an exemplary liquid applicator device according to the present invention.

An exemplary portable liquid applicator device according to the present invention is illustrated generally at 10 in the drawings. The device 10 includes a container 12 elongated along an axis and having a first, closed end 13, and a second end 14 including means defining an opening 15 (see FIG. 2) therein. The device 10 further includes a liquid applicator structure including a fibrous exterior portion for holding a liquid (e.g. contact liquid herbicide such as ROUNDUP by Monsanto), and a handle extending therefrom. In the preferred form illustrated in the drawings, the applicator structure includes a conventional paint roller having a core 17 (see FIG. 3 in particular) of relatively rigid material (e.g. rigid plastic) with a fibrous covering means 18 covering the same, and a handle 19 extending therefrom.

According to the present invention, wiping means, such as wiping ring 20 with one or more (preferably a plurality of) drainage openings 21 formed therein, are provided for wiping off a substantial portion, but not all, of the liquid on the fibrous covering 18 as it is withdrawn from the container second end opening 15. Means are provided, such as the downwardly extending flange 22 attached to the container 12 interior by a friction fit and/or adhesive, for mounting the wiping ring interiorly of the container 12 and spaced from, though adjacent, the second end 14 a distance sufficient for a portion of the fibrous covering 18 to be in contact with the wiping ring 20 though not in substantial contact with a quantity of liquid herbicide 24 disposed in the container 12 at the first end 13 thereof; and spaced from the container first end 13 a distance sufficient for a portion of the covering 18 to be in substantial contact with a quantity of the liquid 24 with no portion of the wiper 20 in substantial contact with the covering 18. The diameter of the opening 25 in the wiping ring 20 is smaller than the diameter of the fibrous covering 18 when surrounding the core 17, while the diameter of the opening 15 is greater than the diameter of the fibrous covering 18 when surrounding the core 17.

In order to provide for replacement of the roller, it is desirable to form one end 27 of the handle 19 (see FIG. 3) so that it is shaped to provide a tight frictional engagement with the interior of core 17. This may be accomplished by deforming the end of a conventional round tube (e.g. of plastic) so that it has a square cross-section, and then forcing the square cross-section into the interior of the core 17. When the fibrous covering means 18 are worn out, destroyed, or contaminated, or the like, the core 17 is merely removed from the handle 19, and the end 27 of handle 19 is reinserted into a core 17 of a new roller. Preferably the handle 19 also includes adjacent the end thereof opposite the portion 27, means defining a hook-receiving opening 29.

As illustrated in FIG. 1, a handle extension 30 may be provided for effectively extending the length of the handle 19. One end 31' of the extension 30 (see FIG. 1) is enlarged so that it can encompass the end of handle 19 adjacent the hook-receiving opening 29, to frictionally engage the handle 19.

The modification of handle extension 30' illustrated in FIG. 5 is especially useful in some horticultural applications where it is desired to positively prevent (to the extent possible) contact of desired plants (e.g. shrubs and fruit trees) with the roller covering 18. In these situations, the end of the extension 30' is flattened as illustrated at 31' and an angle of about 135° is provided between the body of extension 30' and portion 31' thereof. An opening 32' is drilled into the body of extension 30' to receive the handle 19 so that there is an angle of about 45° between the body of the extension 30' and handle 19 (see dotted line in FIG. 5). The keyed opening 33' of a guard means, such as guard 34' (which is formed from a semi-circular pipe section in the embodiment illustrated in the drawings), receives the end 31' of extension 30' (its shape being complimentary to the shape of opening 33'). As illustrated in FIG. 5, even with the guard 34' in place, the roller 18 attached to handle 19 may be fully inserted into container 12 due to the spacing of guard 34' from opening 32', however when the handle 19 is withdrawn from container 12, the guard 34' prevents the roller 18 from touch desired plants above it while the roller 18 contacts undesired plants below guard 34'; and the angled relationship between the body of handle extension 30' and the handle 19 allows ready manueverability of the device 10 into place with the guard 34' properly positioned.

A closure structure also is provided operatively associated with the handle 19 for closing and sealing the opening 15 when the fibrous covering means 18 is inserted completely within the container 12. The closure structure preferably takes the form of a core 33 (see FIGS. 1 and 2) of relatively rigid material (e.g. rigid plastic) rigidly affixed to the handle 19 between the opening 29 and end 27 thereof, and surrounded by a ring 34 of flexible material, such as rubber. As illustrated most clearly in FIG. 2, the means defining the opening 15 in the second end 14 include a first surface portion 36 defining an exterior opening, and tapering to a lip 37 defining an interior opening. The diameter of the flexible ring 34 is substantially the same as (e.g. slightly greater than) the diameter of the exterior opening defined by surface 36, and substantially greater than the diameter of the interior opening defined by the lip 37, so that the flexible material forming the ring 34 will be in tight sealing engagement with the structures 36, 37 as illustrated in FIG. 2 when the liquid applicator structure is completely inserted in the container 12.

In order to prevent entry of foreign particles (e.g. clay) into the container 12 when the liquid applicator structure 18, 19 is being utilized to destroy plants (see FIG. 4), a cap, shown generally at 39 in the drawings, is provided for sealing the opening 15. Preferably the cap comprises a solid core 40 of rigid material (e.g. rigid plastic) surrounded by a ring 41 of flexible material (e.g. rubber), the core 40 and the ring 41 preferably having the same dimensions as the core 33 and ring 34. Means are provided, such as the strap 43, for attaching the cap 39 to the container 12 so that the cap may be moved from a position spaced from the opening 15 and allowing access by the liquid applicator structure thereto (see FIG. 1) to a position in closing and sealing engagement with the opening 15 (see FIG. 4). The strap 43 is connected at one end 44 thereof to the container 12 adjacent the second end 14, and is connected at a portion 45 thereof adjacent the second end 46 thereof to the cap core 40 (see FIG. 2 in particular). Enough of end 46 remains free, however, so that it may be grasped by the user's fingers and moved from the sealing position (FIG. 4) to the detached position (FIG. 1).

Preferably, means are also provided for latching the applicator structure in place within the container 12 between uses of the device 10. This is conveniently accomplished according to the present invention by incorporating the latching structure with the strap 43 and cap 39. A hook 48, adapted to cooperate with the hook-receiving opening 29 in handle 19, is connected to the interior of cap core 40 (as by the same rivet connecting strap 43 to core 40). The opening 29 in handle 19 is positioned along the length of the handle 19 so that when the hook 48 is brought into engagement therewith (see FIG. 2), the strap 43 is tensioned, and exerts a force holding the sealing ring 34 in closing and sealing contact with the container second end 14. For this purpose, the strap 43 preferably is made of a resilient material, such as rubber. When the roller 17, 18 is held in place in the container 12, as illustrated in FIG. 2, a locating portion 50 of container first end 13 is disposed in the interior of the core 17, so that the axis of the core 17 and handle 19 is coextensive with the axes of the container 12 and openings 15, 25.

In order to facilitate carrying of the device 10 during use, a handle is preferably provided facilitating carrying of the container 12 with the second end 14 pointing upwardly (to minimize the chances of spillage of liquid herbicide from the container 12). This is preferably accomplished by providing a strap 52 connected at one end 53 thereof to the container 12 adjacent the first end 13, with a back-turned loop 54 being formed in the strap. The second end of the strap is connected at 55 to the container 12 adjacent the first end 14 thereof, holding the back-turned loop 54 in place. The shape of the handle 52 then facilitates grasping of it by the operator (see FIG. 4) so that the second end 14 points upwardly when normally held in the operator's hand.

When using the device 10 to destroy plants according to the method of the present invention, the following steps are practiced: Liquid contact herbicide, such as ROUNDUP by Monsanto, is disposed with the container 12 so that it partially fills the container with a liquid pool 24. The quantity of liquid herbicide added is small enough so that there can be substantial movement of the fibrous covering 28 of the applicator structure into the container 12 before the liquid pool 24 is contacted. Since such contact herbicides are extremely potent, even such a small amount of herbicide within the container 12 is effective to treat a large area to destroy unwanted plants.

After the container 12 is partially filled with liquid, the structure 19, 18 is inserted through opening 15 to immerse a portion of the covering 18 in the liquid herbicide 24, with the handle 19 sticking outwardly from the container 12. The handle 19 is then pulled upon to partially remove the covering 18 from the container 12, the wiping ring 20 wiping the covering 18 during this movement, to a point just short of the end of travel of the covering 18 with respect to the ring 20. The handle 19 is then pushed so that the covering 18 goes back into the container 12 with a reversal wiping of the covering 18 taking place as a result of its contact with wiping ring 20, but the insertion is to a point such that the covering 18 does not become substantially immersed in the pool 24 of liquid (although some immersion is unobjectionable). This relative movement between the fibrous covering 18 and the wiping ring 20 not only facilitates even distribution of the herbicide on the covering 18, but also effects frothing of the herbicide, resulting in a more effective application of herbicide to plants to be destroyed. Any liquid wiped off by the wiping ring 20 drains through the liquid drainage openings 21.

Figure 4:
FIG. 4 is a schematic illustration showing the device of FIG. 1 in use for practicing an exemplary method according to the present invention.

Subsequent to complete withdrawal of the fibrous covering 18 from the container 12, the cap 39 is pushed into closing, sealing engagement with the opening 15, and the operator touches plants that are desirably to be destroyed with the fibrous covering 18 of the liquid applicator structure, resulting in the destruction of the plants touched thereby (see FIG. 4). When a good deal of the herbicide on the fibrous covering 18 has been removed by contact with plants, the end 46 of strap 43 is grasped and pulled upwardly to detach the cap 39 from closing position with respect to the opening 15, and the liquid applicator structure is reinserted into the container 12. This procedure is repeated, as necessary, until desired plant destruction is completed, with the volume of herbicide within the container 12 being replenished as necessary.

It will thus be seen that according to the present invention a simple and reliable method and apparatus have been provided for the destruction of undesired plants by transferring contact herbicide thereto, in an extremely effective manner. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent devices and methods.

What is claimed is:

1. A method of destroying plants utilizing a portable liquid applicator device including a container having a first, closed end, and a second end with an opening therein; a wiping structure mounted in the container adjacent, but spaced from, the open second end; and a liquid applicator structure with a fibrous exterior portion for holding a frothable liquid herbicide and insertable into and withdrawable from the container through the opening in the container second end, and having a handle; said method comprising the steps of:

(a) disposing frothable liquid contact herbicide within the container so that it is partially filled with liquid, below the level of the wiping structure;
  (b) inserting the liquid applicator structure with fibrous exterior through the opening in the container second end to generally immerse a portion of the liquid applicator structure fibrous exterior portion is liquid herbicide, with the handle sticking outwardly from the container so that the handle never touches the herbicide;
  (c) partially removing the liquid applicator with herbicide held thereby, from the container by pulling on the handle to partially withdraw the liquid applicator structure as the fibrous exterior portion thereof is being wiped by the wiping structure to froth the herbicide, to a point just short of the end of travel of the liquid applicator structure with respect to the wiping structure;
  (d) re-inserting the liquid applicator structure into the container to provide a reverse wiping of the fibrous exterior and frothing of the herbicide but so that the fibrous exterior of the liquid applicator structure does not become substantially immersed in liquid herbicide within the container;
  (e) re-withdrawing the liquid applicator structure from the container through the open second end thereof by pulling on the handle and completely removing the liquid applicator structure from container with frothed herbicide held thereby;
  (f) touching the applicator structure fibrous exterior portion to plants that are to be desirably destroyed, so that herbicide is transferred from the structure to the plants to thereby result in destruction of the plants touched thereby; and
  (g) occasionally repeating steps (b)–(f), if necessary, until desired plant destruction is completed, or until step (a) must be repeated.

2. A method as recited in claim 1 comprising the further steps of: after step (e), placing a capping structure over the container open second to close and seal the open second end thereof; and removing the capping structure from the container second end prior to re-insertion of the liquid applicator structure into the container.

3. A method as recited in claims 1 or 2 wherein step (a) is practiced so that the quantity of liquid herbicide in the container is small enough so that during practice of step (d) most of the liquid applicator structure fibrous exterior can be re-inserted without immersing any substantial portion thereof in liquid herbicide.

4. A method as recited in claim 3 wherein steps (d) and (e) are practiced with the container substantially vertically disposed, with the second end above the first end.

5. A method as recited in claim 2 wherein the liquid applicator device further includes a closure structure operatively associated with the liquid applicator handle for closing the opening in the container second end when the liquid applicator structure is completely inserted into the container; and wherein the capping structure is connected by a strap to the container, and has a hook associated therewith remote from the connection of the strap to the container; and wherein the handle has a hook-receiving opening therein: comprising the further steps of, after step (g), inserting the liquid applicator structure into the container so that the closure structure operatively associated therewith closes the container open second end; and inserting the hook associated with the capping structure into operative engagement with the handle opening.

6. A method as recited in claim 1 wherein the liquid applicator device comprises a hollow roller with fibrous covering means, and wherein the handle is shaped at one end thereof to provide a friction fit with the hollow interior of the roller: comprising the further steps of, after the fibrous exterior of the liquid applicator structure wears out or becomes damaged or contaminated, removing the roller from the handle, and reinserting the friction-fit-shaped end of the handle into the hollow interior of a new roller to provide a friction fit therebetween.

7. A method as recited in claims 1 or 5 wherein the container has a carrying structure associated therewith facilitating carrying of the container with the open second end thereof generally pointing upwardly: and comprising the further steps of carrying the container by the carrying structure with the second end thereof generally pointing upwardly.

8. A portable liquid applicator device comprising:
  a container elongated along an axis and having a first, closed end, and a second end including means defining an opening therein;
  a liquid applicator structure including a fibrous exterior portion, shorter than said container, for holding a liquid, and a handle extending therefrom;
  wiping means for wiping off a substantial portion, but not all, of the liquid on the liquid applicator structure fibrous exterior portion as the liquid applicator structure is withdrawn through the container second end opening, with the liquid wiped-off draining back into the container; and
  means for mounting said wiping means interiorly of said container and spaced from, though adjacent, said container second end a distance sufficient for a portion of said fibrous exterior portion of said liquid applicator structure to be in contact with said wiping means though not in substantial contact with a quantity of liquid disposed in said container at said first end thereof; and spaced from said container first end a distance sufficient for a portion of said liquid applicator structure fibrous exterior portion to be in substantial contact with a quantity of liquid disposed in said container at said first end thereof with no portion of said wiping means in substantial contact with said fibrous exterior portion.

9. A device as recited in claim 8 wherein said wiping means comprises a ring including means defining at least one liquid drainage opening therein; and wherein said mounting means mounts said ring to the interior of said container with the axis through said ring opening coextensive with said container axis.

10. A device as recited in claim 9 wherein said liquid applicator device comprises a handle, and a roller having a core of relatively rigid material covered with a fibrous covering, said fibrous covering on said core having a diameter greater than the diameter of said ring opening, but less than the diameter of said container second end opening.

11. A device as recited in claim 8 wherein said liquid applicator device comprises a handle, and a roller having a core of relatively rigid material covered with a fibrous covering, said fibrous covering on said core having a diameter less than the diameter of said container second end opening.

12. A device as recited in claims 10 or 11 further comprising means mounted in said container first end for locating said roller within said container with the roller axis in alignment with said container axis.

13. A device as recited in claims 10 or 11 wherein said handle has one end thereof shaped to provide a tight frictional engagement with the interior of said roller core so that said core and handle can be disengaged if desired and said handle forced into frictional engagement with another roller core.

14. A device as recited in claim 13 wherein said handle one end is substantially square in cross-section and wherein said handle has a tapering transition from said square cross-section end to the opposite end which is circular in cross-section.

15. A device as recited in claim 8 further comprising a closure structure operatively associated with said liquid applicator handle for closing and sealing the opening in said container second end when said liquid applicator structure is completely inserted into said container.

16. A device as recited in claim 15 further comprising means for latching said applicator device in place in said closing and sealing position.

17. A device as recited in claim 16 wherein said latching means comprises means defining an opening in said handle remote from said fibrous exterior portion; a cap for capping said container second end opening; a strap connecting said cap to said container adjacent said container second end; and hook means operatively connected to said cap for engaging said handle opening with said strap under tension when said liquid applicator device is inserted within said container.

18. A device as recited in claim 15 wherein said closure structure comprises a ring of flexible material surrounding and extending outwardly from said handle, and spaced from said fibrous exterior portion.

19. A device as recited in claim 18 wherein said liquid applicator device comprises a handle, and a roller having a core of relatively rigid material covered with a fibrous covering, said fibrous covering on said core having a diameter less than the diameter of said container second end opening; said ring being disposed on said handle spaced from said roller.

20. A device as recited in claim 8 further comprising a carrying handle means attached to said container for facilitating carrying of said container with said second end thereof pointing upwardly.

21. A device as recited in claim 20 wherein said carrying handle means comprises a strap having one end thereof connected to said container adjacent said first end thereof, and a turned-back loop formed at the other end of the strap and said other end of the strap connected to said container adjacent said second end thereof.

22. A method as recited in claim 1 comprising the further step of positively preventing touching of the fibrous exterior portion of the herbicide applicator device to plants along a portion of the periphery thereof, while allowing contact along the rest of the periphery.

23. A device as recited in claim 8 further comprising a handle extension including a body portion means for receiving said handle at an angle, and an end portion extending substantially perpendicularly to said handle; a guard means for positively preventing contact of said fibrous exterior portion of said liquid applicator device along a portion of the periphery thereof while allowing contact along the rest of the periphery; and means defining a keyed opening in said guard means complimentary in shape to said handle extension end portion, and receiving same, so that the liquid applicator device may be inserted into said container without hinderance.

24. A portable liquid applicator device comprising:
a container elongated along an axis and having a first, closed end, and a second end including means defining an opening therein, said means comprising an exterior opening defined by a wall portion tapering to provide a lip which defines an interior opening;
a liquid applicator structure including a fibrous exterior portion for holding a liquid, and a handle extending therefrom;
a cap distinct from said liquid applicator structure for closing and sealing said container second end opening said cap comprising a core disc of substantially rigid material, and surrounded by a ring of flexible material having an outside diameter substantially equal to the inside diameter of said second end exterior opening and greater than the diameter of the interior opening formed by said lip; and
means for attaching said cap to said container so that said cap may be moved from a position spaced from said opening and allowing access by said liquid applicator structure thereto, to a position in closing and sealing engagement with said opening.

25. A portable liquid applicator device comprising:
a container elongated along an axis and having a first, closed end, and a second end including means defining an opening therein;
a liquid applicator structure including a fibrous exterior portion for holding a liquid, and a handle extending therefrom, the handle comprising means defining a hook-receiving opening therein;
a cap distinct from said liquid applicator structure for closing and sealing said container second end opening;
means for attaching said cap to said container so that said cap may be moved from a position spaced from said opening and allowing access by said liquid applicator structure thereto, to a position in closing and sealing engagement with said opening, said ataching means comprising a strap attached at one end thereof to said container, and adjacent the other end thereof to said cap; and
means for operatively attaching said hook to said cap so that said hook may be inserted in said hook-receiving opening in said handle with said liquid applicator structure in place in said container and with said strap under tension holding said liquid applicator structure in place in said container.

26. A device as recited in claim 25 wherein the other end of said strap extends past the connection thereof to said cap to provide a handgrip for removing the cap from closing and sealing engagement with said second end opening.

27. A portable liquid applicator device comprising:

a container elongated along an axis and having a first, closed end, and a second end including means defining an opening therein;

a liquid applicator structure including a roller having a core of relatively rigid material and a fibrous exterior covering portion for holding a liquid, and a handle extending therefrom the fibrous covering on said core having a diameter less than the diameter of said container second end opening; and said handle having one end thereof substantially square and shaped to provide a tight frictional engagement with the interior of said roller core so that said core and handle can be disengaged if desired and said handle forced into frictional engagement with another roller core, and said handle having a tapering transition from said square cross-section end to the opposite end which is circular in cross-section;

a cap distinct from said liquid applicator structure for closing and sealing said container second end opening; and means for attaching said cap to said container so that said cap may be moved from a position spaced from said opening and allowing access by said liquid applicator structure thereto, to a position in closing and sealing engagement with said opening.

28. A device as recited in claim 27 further comprising means mounted in said container first end for locating said roller within said container with the roller axis in alignment with said container axis.

29. A device as recited in claim 24, 25 or 27 further comprising a handle extension having one end thereof formed to fit over the end of said handle remote from said fibrous exterior portion to provide an interference fit therewith, to effectively extend the length of said handle.

30. A portable liquid applicator device comprising:

a container elongated along an axis and having a first, closed end, and a second end including means defining an opening therein;

a liquid applicator structure including a fibrous exterior portion for holding a liquid, and a handle extending therefrom;

a cap distinct from said liquid applicator structure for closing and sealing said container second end opening;

means for attaching said cap to said container so that said cap may be moved from a position spaced from said opening and allowing access by said liquid applicator structure thereto, to a position in closing and sealing engagement with said opening;

a handle extension including a body portion means for receiving said handle at an angle, and an end portion extending substantially perpendicularly to said handle;

a guard means for positively preventing contact of said fibrous exterior portion of said liquid applicator device along a portion of the periphery thereof while allowing contact along the rest of the periphery; and means defining a keyed opening in said guard means complimentary in shaped to said handle extension end portion, and receiving same, so that the liquid applicator device may be inserted into said container without hinderance.

* * * * *